E. W. BAXTER.
TRACTOR WHEEL.
APPLICATION FILED APR. 10, 1917.

1,285,594.

Patented Nov. 26, 1918.
2 SHEETS—SHEET 1.

INVENTOR
Ernest W. Baxter

BY Victor J. Evans
ATTORNEY

WITNESSES

E. W. BAXTER.
TRACTOR WHEEL.
APPLICATION FILED APR. 10, 1917.

1,285,594.

Patented Nov. 26, 1918.
2 SHEETS—SHEET 2.

WITNESSES
J. M. Jester
Rodney M. Smith

INVENTOR
Ernest W. Baxter
BY Victor J. Evans
ATTORNEY

UNITED STATES PATENT OFFICE.

ERNEST W. BAXTER, OF VAN WERT, OHIO.

TRACTOR-WHEEL.

1,285,594.  Specification of Letters Patent.  Patented Nov. 26, 1918.

Application filed April 10, 1917. Serial No. 161,038.

*To all whom it may concern:*

Be it known that I, ERNEST W. BAXTER, a citizen of the United States, residing at Van Wert, in the county of Van Wert and State of Ohio, have invented new and useful Improvements in Tractor-Wheels, of which the following is a specification.

This invention relates to tractor wheels and comprehends the provision of a tractor wheel having a plurality of traction plates secured to the rim thereof in such manner as to lay a track for the wheel as it moves over the surface of the ground and to provide increased traction surface.

One of the objects of the invention resides in the provision of an improved tractor wheel having a series of primary traction plates secured to its rim and a plurality of secondary traction plates also secured to the rim between the first mentioned plates, the secondary plates acting as bridges or cross over members for spanning the points between the primary traction plates to provide a smooth track for the wheel.

The invention also aims to generally improve tractor wheels of this nature to render them more practical, efficient and commercially desirable.

With these and other objects in view as will become more apparent as the description proceeds, the invention consists in certain novel features of construction, combination and arrangement of parts as will be hereinafter fully described, illustrated and claimed.

Figure 1:
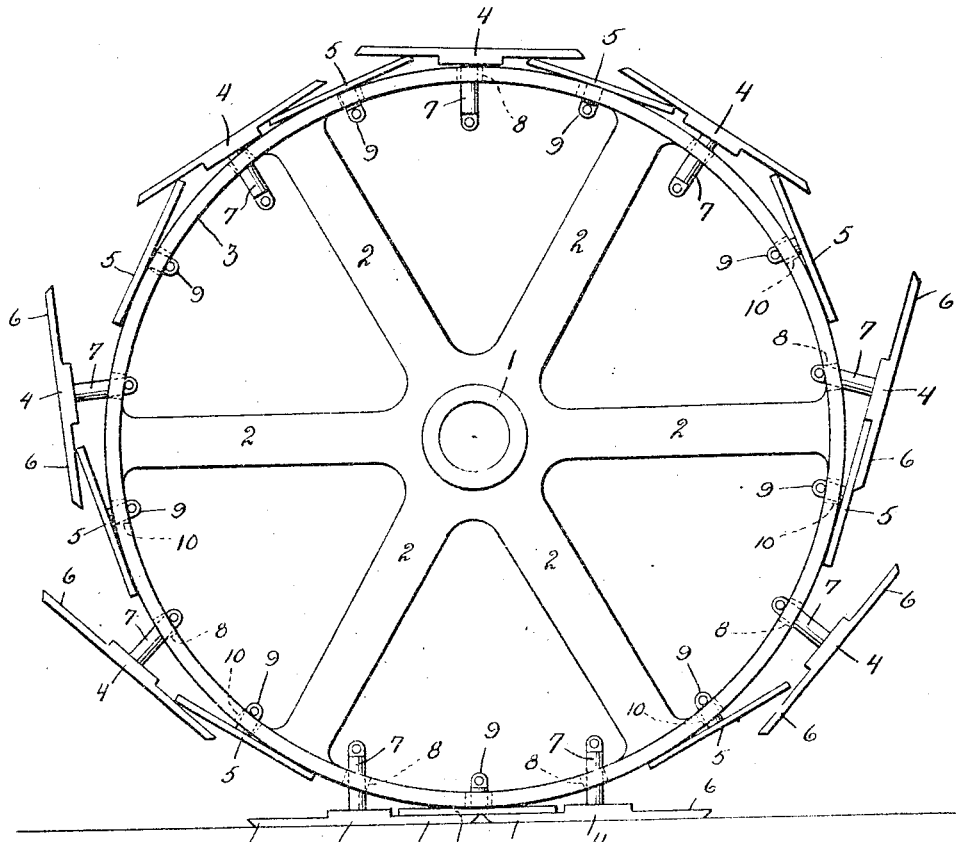
Figure 1 is a side elevation showing a tractor wheel constructed in accordance with my invention.
Figure 2:
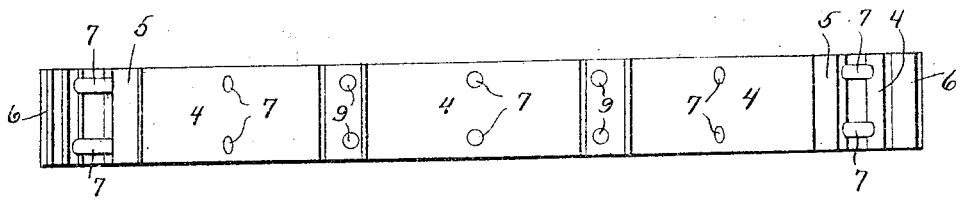
Fig. 2 is a fragmentary plan view showing a number of plates secured to the rim of the wheel.
Figure 3:
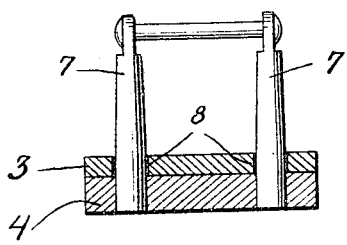
Fig. 3 is a transverse sectional view.
Figure 4:
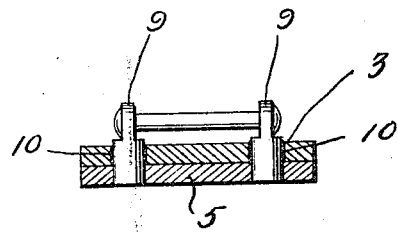
Fig. 4 is a second transverse sectional view.
Figure 5:
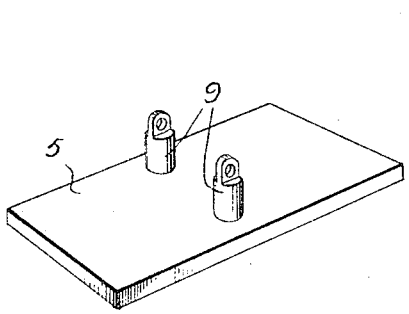
Fig. 5 is a detail perspective view of one of the secondary tractor plates.
Figure 6:
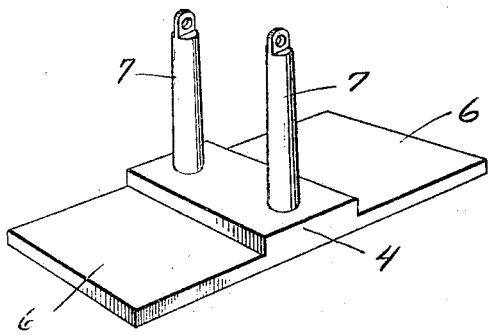
Fig. 6 is a perspective view of one of the primary tractor plates.

Referring in detail to the drawings by numerals, 1 designates the hub, 2 the spokes and 3 the rim of a tractor wheel constructed in accordance with my invention. The rim is preferably formed of flat metal and has secured to it a plurality of primary traction plates 4 and a plurality of secondary traction plates 5 alternated with the primary plates.

The primary or main traction plates are rectangular and equal substantially in width to the width of the rim 3. These plates are reduced one half in thickness adjacent their end portions as indicated by the numeral 6 and a pair of arms 7 are secured centrally of the plate in transverse alinement and extend inwardly through slightly elongated openings 8 in the rim 3 of the wheel. The inner ends of the arms are connected by a bolt or other suitable fastening members extending through apertures in the arms as shown.

The secondary traction plates 5 are of the same thickness throughout, are rectangular in shape but somewhat shorter than the primary traction plates and are equal in width to the rim 3. A pair of arms 9 are secured centrally of each of the secondary plates in transverse alinement therewith and extend inwardly through elongated circumferential openings 10 in the rim 3. The inner ends of these arms are connected by a bolt 11 or other suitable fastener which extends through openings in the arms adjacent their free terminals.

The primary traction plates are spaced sufficiently far apart to prevent them overlapping one another and their arms are sufficiently long to allow two of the plates to simultaneously contact with the ground in slightly spaced relation. The secondary traction plates span the distance between the opposed ends of the primary traction plates, and are of such length as to fit between the central unreduced portions of the primary plates and are one half as thick as the central portions of the primary plates. By proportioning the secondary plates in this fashion, and connecting them to the rim as shown, they coöperate with the primary traction plates to form a smooth track for the rim to roll over. It will also be noted that the arms of the secondary plates are shorter than the arms of the primary plates.

As the wheel revolves the primary traction plates are successively brought in contact with the ground to form a track for the wheel and as the wheel continues to revolve the plates are carried upwardly and fall downwardly against the rim of the wheel with a considerable jar which frees them of dirt, mud and other accumulations.

From the foregoing description taken in connection with the accompanying drawings, it will be seen that I have provided a tractor wheel having increased traction power and furnished with a plurality of tractor plates which may be easily attached to and detached from the wheel without materially weakening the same.

While I have shown and described the preferred embodiments of my invention, it will be clearly understood that I do not wish to be limited to this construction but may make such changes as will fall within the scope and spirit of the invention as claimed.

What I claim is:

In a traction wheel, a rim, a plurality of primary traction plates associated with said rim and each having an enlarged central portion and reduced extremities, secondary traction plates associated with the rim and interposed between the latter and the first mentioned plates, said secondary plates overlapping the adjacent extremities of each pair of the first mentioned plates, and said secondary plates being adapted to repose upon the reduced extremities of said primary plates and lie flush with the upper surfaces thereof when said plates are actively positioned, a pair of arms secured centrally upon each of all of said plates and extending through holes in said rim for sliding and pivotal movement, and a transverse rod connecting each pair of arms, the arms on said secondary plates being of less length than the arms on said primary plates whereby proper relative positioning of said primary and secondary plates will be effected.

In testimony whereof I affix my signature.

ERNEST W. BAXTER.

Copies of this patent may be obtained for five cents each, by addressing the "Commissioner of Patents, Washington, D. C."